United States Patent [19]

Joannou et al.

[11] Patent Number: 4,875,125
[45] Date of Patent: Oct. 17, 1989

[54] TAPE HEAD CLEANER CARTRIDGE

[75] Inventors: Kyriacos Joannou, Wayland; Kenneth Wilson, Lexington; Alan B. Lowry, Canton, all of Mass.

[73] Assignee: Pericomp Corporation, Natick, Mass.

[21] Appl. No.: 108,062

[22] Filed: Oct. 14, 1987

[51] Int. Cl.⁴ .............................................. G11B 5/41
[52] U.S. Cl. .................................................... 360/128
[58] Field of Search .................. 360/128; 15/DIG. 12

[56] References Cited

U.S. PATENT DOCUMENTS

| | | | |
|---|---|---|---|
| 3,761,994 | 10/1973 | Becht | 15/210 R |
| 4,100,643 | 7/1978 | Horian | 360/128 X |
| 4,225,893 | 9/1980 | Loiselle | 360/128 |
| 4,272,796 | 6/1981 | Van Kreuningen et al. | 360/128 |
| 4,510,545 | 4/1985 | Boudreau | 360/128 |
| 4,514,777 | 4/1985 | Kudo | 360/128 |
| 4,594,629 | 6/1986 | d'Alayer de Costemore d'Arc | 360/128 |
| 4,631,614 | 12/1986 | Davis et al. | 360/128 |

Primary Examiner—A. J. Heinz
Attorney, Agent, or Firm—Wolf, Greenfield & Sacks

[57] ABSTRACT

A tape head cleaner cartridge for receipt in a tape machine having a magnetic tape head and comprising a cartridge housing for supporting a cleaning pad that is supported by and operated from a lever. The lever may be manually operated to cause the cleaning pad to transition across the tape head in direction of tape travel. In an alternate embodiment of the invention, the cartridge supports both a magnetic head cleaning pad and a capstan cleaning pad. A dispenser is provided for a plurality of cleaning pads. A kit is provided for containing the cartridge, dispenser and cleaning fluid.

28 Claims, 6 Drawing Sheets

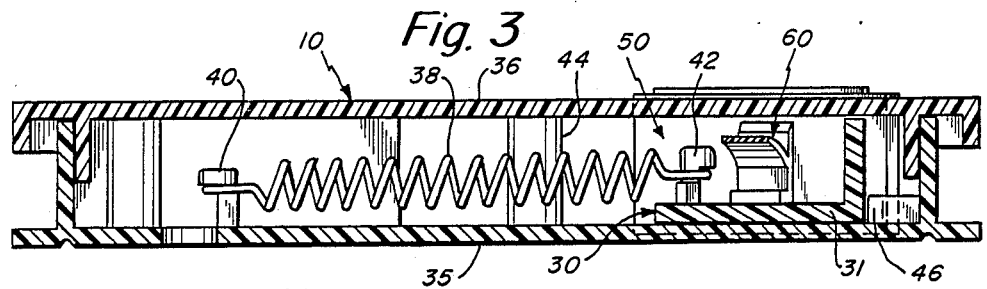
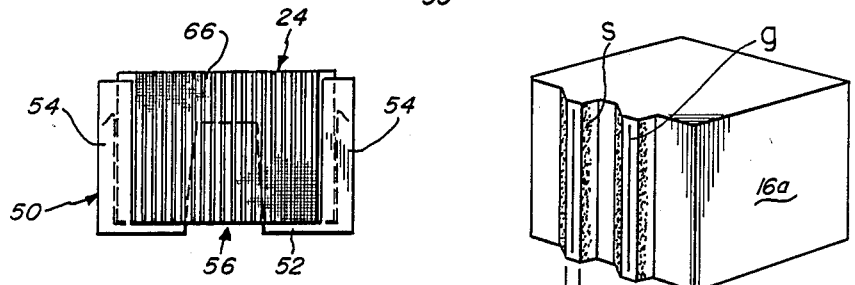
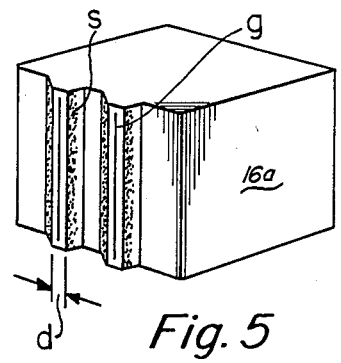
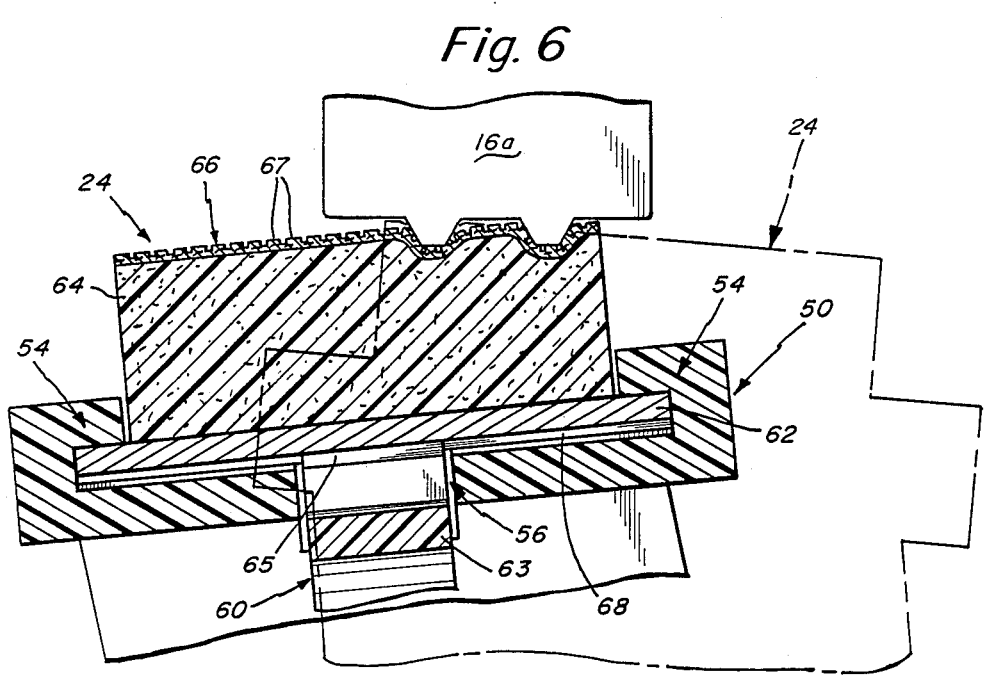

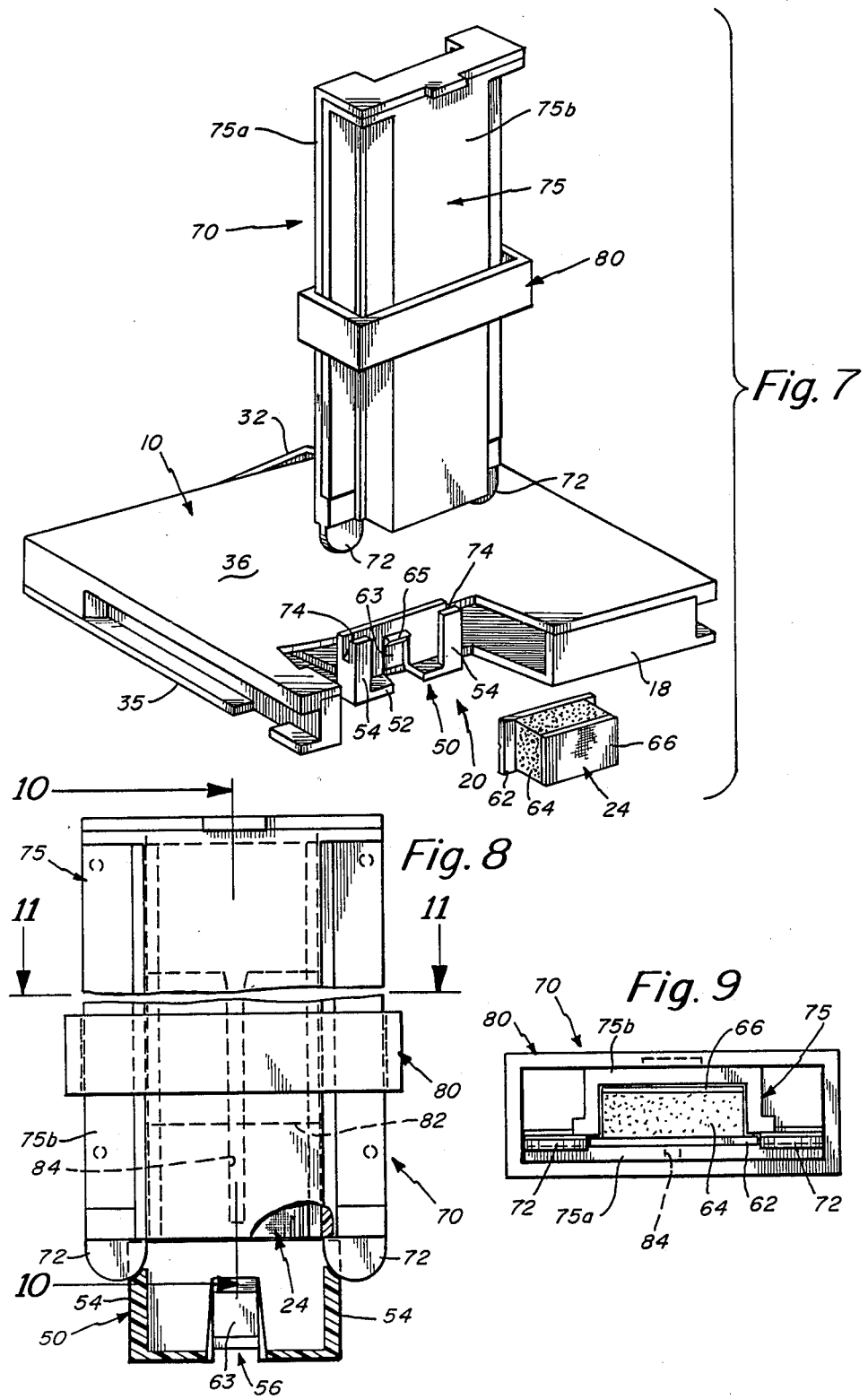

TAPE HEAD CLEANER CARTRIDGE

BACKGROUND OF THE INVENTION

1. Field of the Invention

The present invention relates in general to magnetic recording heads associated with cartridge-type drives, and pertains, more particularly, to a tape head cleaner cartridge that is adapted for receipt in a tape machine that includes a magnetic tape head. Even more particularly, the invention also relates to a tape head cleaner cartridge that includes cleaning pads for both the magnetic tape head as well as the drive capstan. In addition, in accordance with the present invention, there is provided a novel dispenser for containing a plurality of cleaning pads constructed to enable ready replacement of the head and capstan cleaning pads of the cartridge.

2. Background Discussion

In tape players and other types of tape machines, usually magnetic tape machines, the magnetic recording heads in cartridge-type drives are not easily accessible. Therefore, the inspection of the magnetic head and also the capstan, as well as the cleaning of these components, becomes a problem. When a recording head is sufficiently exposed so that cleaning can be accomplished manually, the head can be cleaned by using a lint-free cloth that is charged with cleaning fluid. One gently wipes the head surface in the direction of tape travel. Another technique for cleaning the magnetic head is to use a Q-tip saturated with cleaning fluid to wipe the head surface. The use of a lint-free cloth is not practical usually due to space limitations. The other method of using a Q-tip is not convenient and may cause damage to the head by exerting excessive force that might change the azimuth of the head. A force as little as 10 ounces of force may displace the position of the head. Also, this method leaves cotton on the head which definitely creates problems, collecting debris from the tape and spacing the tape from the head when in operation. The head-to-tape contact area of the head is highly polished and is a smooth surface that can easily be scratched by rough materials coming in contact with the head during the cleaning operation.

Magnetic heads used by cartridge/cassette drive machines are designed to achieve good head-to-tape contact necessary for high density recording/reproducing of signals with uniform amplitude and minimum amplitude modulation. Because of this requirement, the design dictates that there is a minimum head-to-tape contact area that is on the order of 0.010 inch–0.030 inch maximum across the tape width. This is illustrated by the dimension d in FIG. 5 herein.

As the tape passes over the read/write head, loose particles on the tape land on the slope or shoulder of the head contour as illustrated at s in FIG. 5. These loose particles may include particles of dust, oxide from the tape coating, or plastic from the base material. When an excessive number of particles build up on the edges of the contour, some of these particles are attracted by the tape and swept over the gap resulting in their being a space between the tape and the head. This can easily cause data errors.

Thus, the removal of these loose particles is important in providing proper operation of the machine. The cleaning of the head by removing these particles and other debris in the vicinity of the read gap as illustrated by gap g in FIG. 5, is done with materials and cleaning agents that do not affect the highly polished surface of the head. The mechanical force applied on the head during cleaning should be on the order of only a small percentage, say 10 percent, of the force that would normally be required to dislodge the head from its normal position. Any excessive force might dislodge the head and change the calibration azimuth angle.

There are several prior art patents that describe various types of devices for cleaning magnetic heads and/or capstans. Refer to the following U.S. patents: 4,514,777; 4,631,614; 3,761,994; 4,594,629; 4,225,893; 4,272,796; and 4,510,545. Virtually all of these patents employ some type of a cleaning pad or cleaning wad. For example, the Kudo U.S. Pat. No. 4,514,777 describes a cleaning pad that is actuated by a handle bar. It is noted that this pad moves transversely to the tape travel direction. The Davis et al U.S. Pat. No. 4,631,614 also employs a cleaning pad that may be saturated with a cleaning fluid and that is described as being constructed of polyurethane foam. The prior art teaches that the cleaning action is to be without any abrasive action. Refer, for example, to the Becht U.S. Pat. No. 3,761,994 where they teach the use of a cleaning pad of a soft absorbent material such as felt without the use of any abrasive action. Also refer to the Van Kreuningen et al U.S. Pat. No. 4,272,796 and its cleaning pad used without abrasives.

OBJECTS OF THE INVENTION

It is accordingly an object of the present invention to provide an improved tape head cleaner embodied in a cartridge and which in one embodiment can be used to clean the magnetic head alone while in another embodiment employs separate pads for the tape head and capstan, respectively.

Another object of the present invention is to provide an improved tape head cleaner cartridge in which the head cleaning pad is adapted to be moved manually in the direction of tape travel so as to enhance dislodgment of particles from the tape head to in turn enhance cleaning action.

A further object of the present invention is to provide an improved cleaning pad and one which in particular is adapted for providing limited abrasive action so as to provide more effective cleaning of the magnetic head.

Still a further object of the present invention is to provide a dispenser for containing a plurality of cleaning pads and which is adapted to interrelate to the cartridge for ready replacement of the cartridge cleaning pad.

Another object of the present invention is to provide a tape head cleaner kit that includes the tape head cleaner cartridge, pad dispenser, and cleaning fluid.

SUMMARY OF THE INVENTION

To accomplish the foregoing and other objects, features, and advantages of the invention, there is provided a tape head cleaner cartridge that is adapted for receipt in a tape machine that has a magnetic tape head as well as a drive capstan. In accordance with one embodiment of the present invention, the cleaner cartridge supports only a magnetic tape head cleaner pad. In an alternate embodiment of the invention the cartridge contains both a head cleaning pad, as well as a capstan cleaning pad. The cartridge comprises a cartridge housing having front and rear walls. A cleaning pad and a pad support and actuating lever having separate support and actuating ends. Means are provided for pivotally supporting the lever in the cartridge housing. Means are provided at the lever support end for supporting the cleaning pad adjacent to the front wall. The cartridge housing front wall has means defining an access opening to permit positioning of the cleaning pad for contact with the tape head. In the embodiment of the invention in which two cleaning pads are employed the access opening is sufficiently wide so as to accommodate positioning of both cleaning pads, one for the magnetic tape head which is a movable pad and the other for the capstan which is a stationary pad.

In connection with the movable magnetic head pad, the cartridge housing is provided with a rear wall having an aperture for receiving at least part of the lever actuating end of the pad support and actuating lever. Means are provided disposed in the cartridge housing for biasing the lever to a first position. The actuating end of the lever is capable of manual manipulation to a second position wherey the head cleaning pad transitions across the tape head in direction of tape travel between the aforementioned first and second positions.

In accordance with further features of the invention, the lever has its actuating end extending out of the housing in the first position thereof. The lever actuating end is manipulated inwardly to its second position. The lever actuating end has an actuating wall that is engaged manually and that is adapted to be aligned with the housing rear wall in the second position of the lever. This transition between positions of the lever causes the aforementioned transitioning across the tape head of the cleaning pad. The means for biasing comprises a spring means having one end fixed in position in the housing and having the other end secured to the lever. The means for supporting the cleaning pad includes a pad receiving compartment having a bottom ledge upon which the pad may rest. Resilient means are also disposed in the housing for holding the cleaning pad in place in the compartment. In this connection, the cleaning pad preferably includes a support plate as well as a resilient pad. The resilient pad may be constructed of a polyester foam. The support plate may be metal or plastic. The resilient means has a flexible end adapted to be urged against the pad support plate to hold the pad in place. In this connection, the support plate is preferably recessed to receive the flexible end. The resilient means is preferably of bowed construction to be described hereinafter.

In accordance with a further aspect of the present invention, there is provided an improved cleaning pad for cleaning a magnetic tape head and adapted to be supported in a tape head cleaner cartridge. This cleaning pad comprises a support base, a resilient layer of a soft compressible material such as the aforementioned polyester foam and means for securing the resilient layer on the support base. Also provided is a mesh layer that may be formed of, for example, nylon tricot as well as means for securing the mesh layer on the resilient layer on the side thereof remote from the support base. The mesh layer provides the contact surface for the head and a resilient layer provides spring loading to urge the mesh layer into proper contact. The mesh layer is substantially thinner than the resilient layer and includes material ribs for providing controlled and limited abrasive action on the tape head. The resilient layer may have a gap therein to enhance head cleaning. The support base may comprise a rigid plate member that may be constructed of metal or plastic. The means that are used for securing the mesh layer to the resilient layer preferably comprises an adhesive of a foam that maintains its flexibility so that the pad can conform to different head contours.

In accordance with still a further feature of the present invention, there is provided in combination with the tape head cleaner cartridge, a cleaning pad holder or dispenser that is adapted to contain a plurality of separate cleaning pads. Each of these cleaning pads is preferably comprised of at least the support base and resilient pad. This dispenser is comprised of a housing for storing the pads along with a slide member that is manually engaged for expelling the pads, one at a time, from the housing. The pad dispenser includes position alignment means adapted to engage with the pad support means of the cartridge to enable ready transfer of the pads, one at a time, to the pad support means that is provided in the cartridge.

In accordance with still a further feature of the present invention, there are provided a pair of cleaning pads. A first of these pads is supported in the cartridge housing in a manner so that it can be moved from side to side generally in the direction of tape travel as far as the position of the head is concerned. There is also provided a second cleaning pad that is mounted in the housing in a stationary position. This stationary cleaning pad is used to clean the tape machine capstan. Both of these cleaning pads are disposed at an opening in a front wall of the cartridge housing and are disposed in adjacent relative position.

BRIEF DESCRIPTION OF THE DRAWINGS

Numerous other objects, features, and advantages of the invention should now become apparent upon a reading of the following detailed description taken in conjunction with the accompanying drawings, in which:

FIG. 3 is a cross-sectional view taken along line 3—3 of FIG. 1;

FIG. 4 is a cross-sectional view taken along line 4—4 of FIG. 2

FIG. 5 is a perspective view schematically illustrating a typical magnetic tape read/write head;

FIG. 6 is a cross-sectional view taken along line 6—6 in FIG. 2;

FIG. 7 is a perspective view illustrating the combination of a tape head cleaner cartridge and pad dispenser;

FIG. 8 is a plan view partially cut away of the pad dispenser;

FIG. 9 is an end view of the dispenser illustrated in FIGS. 7 and 8.

DETAILED DESCRIPTION

Figure 10:
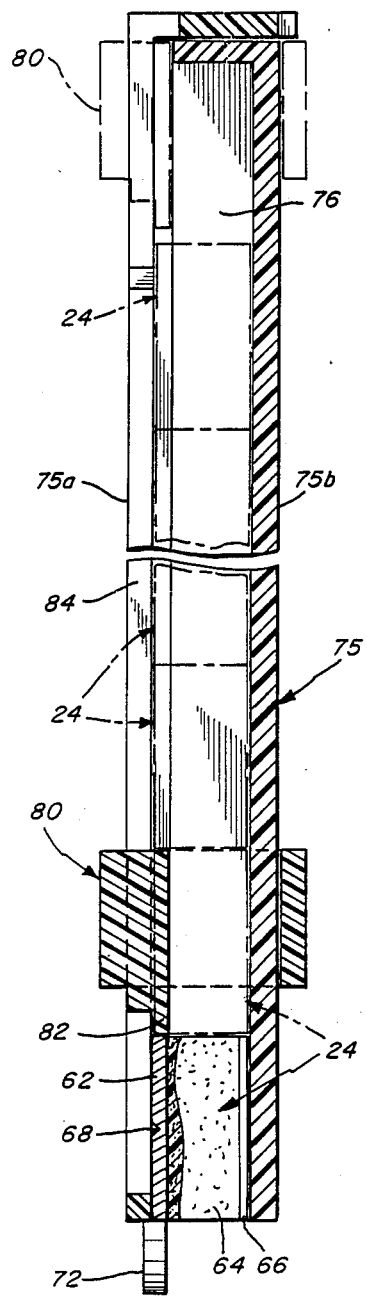
FIG. 10 is a cross-sectional view taken along line 10—10 of FIG. 8.
Figure 11:
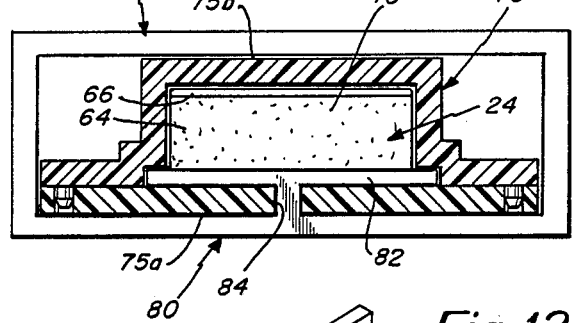
FIG. 11 is a cross-sectional view taken along line 11—11 of FIG. 8.
Figure 12:
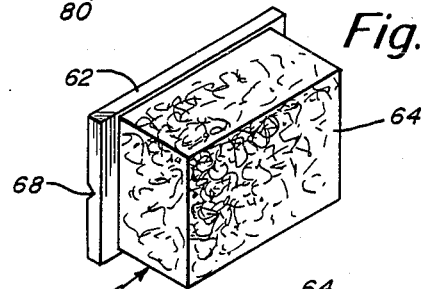
FIG. 12 is a perspective view illustrating a first embodiment of a cleaning pad.
Figure 13:
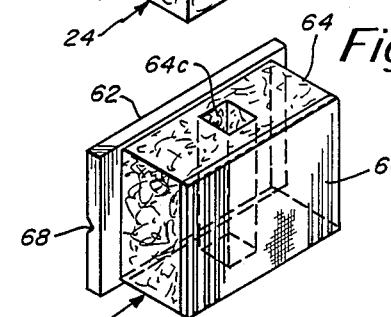
FIG. 13 is a perspective view illustrating a second embodiment of a cleaning pad.
Figure 14:
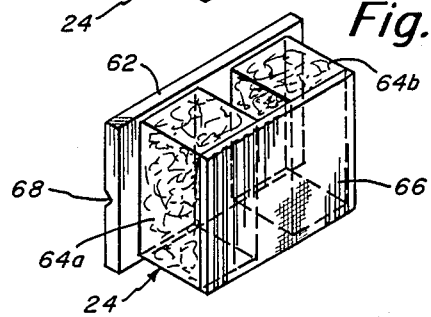
FIG. 14 is a perspective view illustrating a third embodiment of a cleaning pad.
Figure 16:
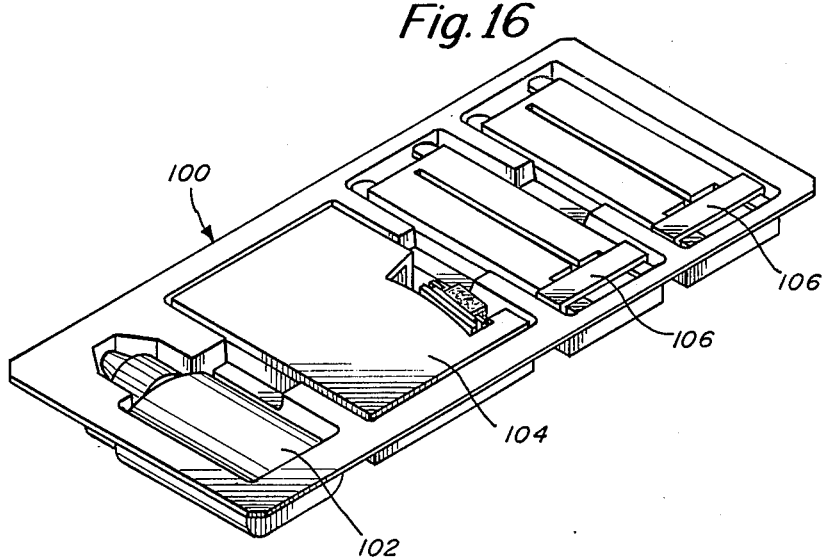
FIG. 16 is a perspective view of a head cleaning kit as in accordance with the present invention and including the cleaner cartridge, dispensers, and cleaning fluid.
Figure 17:
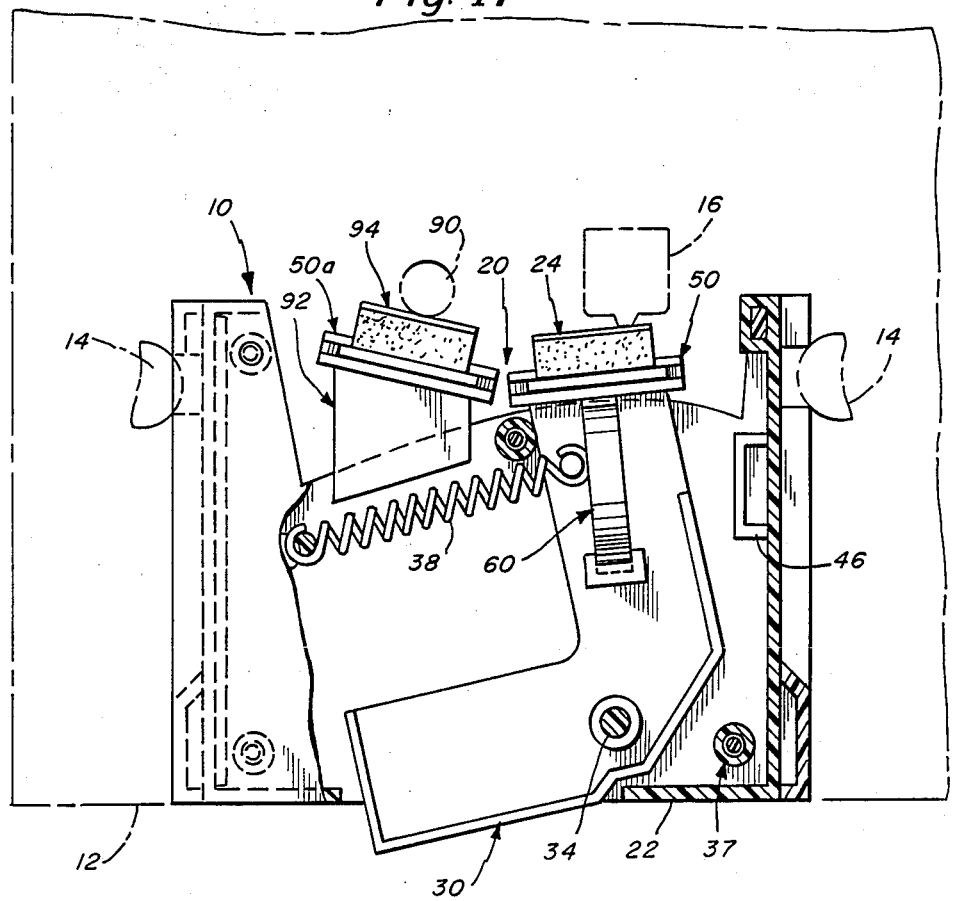
FIG. 17 is a cut away view illustrating an alternate embodiment of the invention incorporating both a tape head cleaning pad and a capstan cleaning pad.
Figure 18:
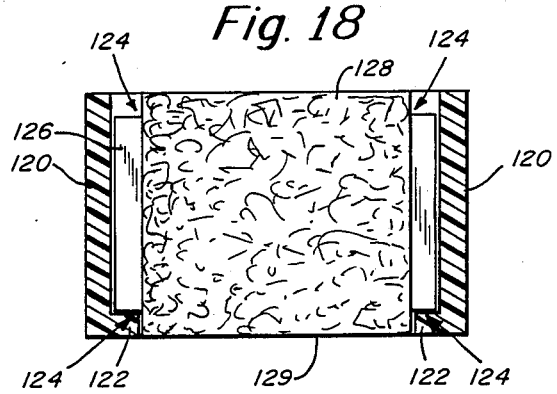
FIG. 18 is a cross sectional view of an alternate embodiment of the cleaning pad construction.

Reference is now made to the drawings herein. The basic tape head cleaner cartridge is illustrated in FIGS. 1–6. A head cleaner pad dispenser is illustrated in FIGS. 7–11. FIGS. 12–14 illustrate different versions of the cleaning pad in accordance with the invention. FIG. 16 illustrates a kit for the cleaning cartridge, dispenser, and cleaning fluid. FIG. 17 illustrates an alternate embodiment of the invention employing a movable head cleaning pad and a stationary capstan cleaning pad. FIG. 18 illustrates an alternate pad construction.

Generally speaking, the cartridge of the present invention includes a housing that is constructed to be equivalent to that of a data cartridge as far as the outside dimensions are concerned. This is preferably constructed of a plastic material. The cleaning pad is assembled on an arm extending in the cartridge. When the arm is pressed toward the housing, the cleaning pad moves in a substantially radially direction and in a direction that is the same as magnetic tape movement would occur if a usual data cartridge were in the machine. This movement in tape travel direction wipes across the surface of the head to clean it.

Figure 1:
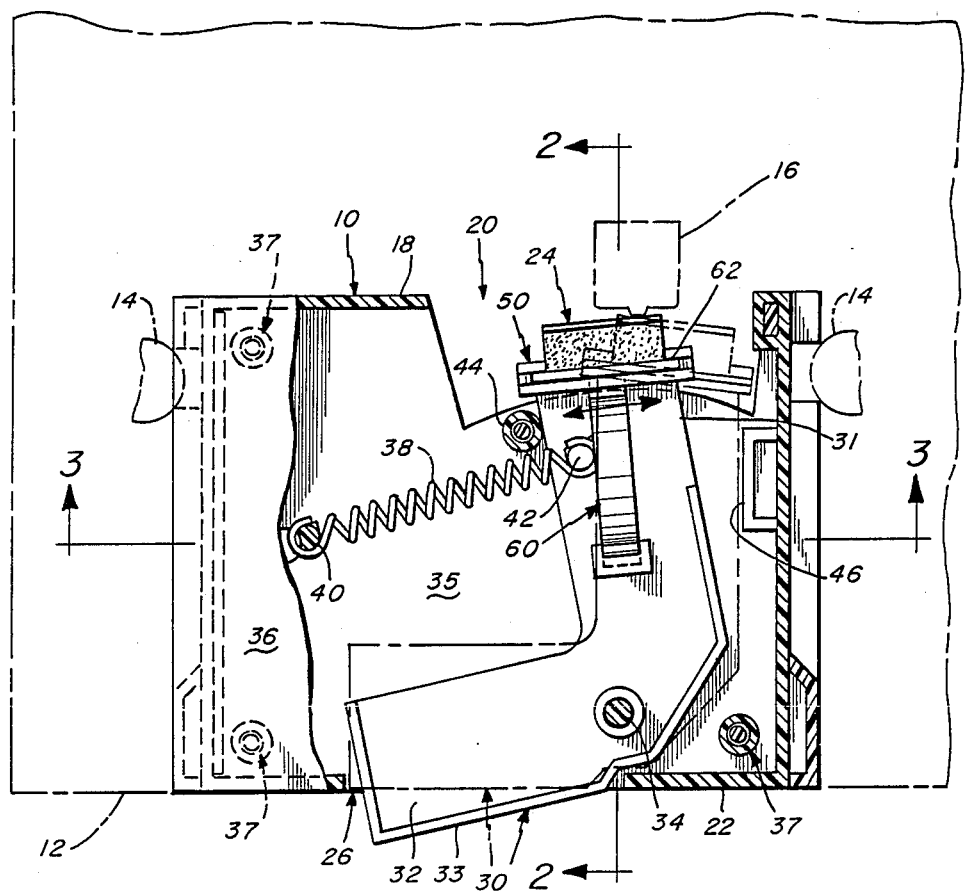
FIG. 1 is a plan view of the tape head cleaner cartridge of the present invention partially cut away to show internal components.

Thus, with reference to the drawings, there is described a tape head cleaner cartridge that is comprised of a housing 10 that may be generally of the shape of the normal data cartridge used with the tape machine. It is noted in FIG. 1 of the drawings that the tape machine or tape deck is illustrated at 12 in phantom outline. Also illustrated in FIG. 1 in phantom outline are the grabbing rollers or fingers 14 that engage and position the cartridge housing in place. FIG. 1 also illustrates a read-only tape head at 16. Also note FIG. 5 for an illustration of a perspective view of a read/write head 16a.

The cartridge housing 10 includes a plurality of walls, including side walls, front and rear walls, and top and bottom walls. In particular, as illustrated in FIG. 1, the housing is provided with a front wall 18 that is provided with an opening as illustrated at 20. The cleaning pad 24 illustrated in FIG. 1 is supported, as will be described in further detail hereinafter, to move from side-to-side in the opening 20. The housing 10 is also provided with a rear wall 22 that is likewise provided with an opening, illustrated in FIG. 1 by the aperture 26. The aperture 26 accommodates a part of the actuating mechanism for moving the cleaning pad 24, all to be described in further detail hereinafter.

Figure 2:
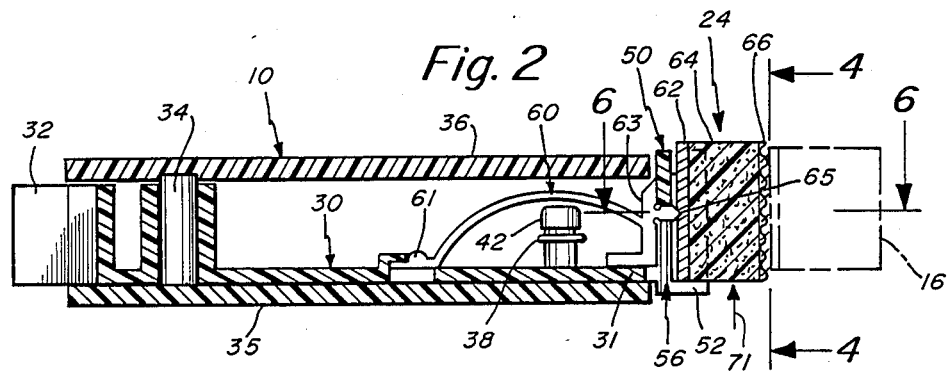
FIG. 2 is a cross-sectional view taken along line 2—2 of FIG. 1.

Within the housing 10 there is disposed the pad support and actuating lever 30. The lever 30 is generally of L-shaped and has separate support and actuating ends. This is clearly illustrated in FIG. 1 by the support end 31 and the actuating end 32. Means are provided associated with the pad support and actuating lever 30, for pivotally supporting the lever in the cartridge housing. This is illustrated in, for example, FIGS. 1 and 2 by the support pin 34 that extends integrally from the bottom wall 35 of the cartridge housing 10. The pin 34 may also extend into a slight recess, as illustrated in FIG. 2, in the top wall 36 of the housing 10.

The housing 10 is preferably constructed of a hard plastic material. The pad support and actuating lever 30 is also preferably constructed of a hard plastic material. The housing 10 is generally provided in two separate top and bottom sections as clearly depicted in FIG. 3. Note the bottom section with bottom wall 35 and the top section with top wall 36. These top and bottom sections interlock together by means of interlocking means such as illustrated at 37 in FIG. 1. These means include a hollow post extending at the corner of the housing from the bottom wall in combination with a pin that extends downwardly and engages the post; the pin extends from the top wall 36.

Now, as far as the lever 30 is concerned, mention has been made previously of the pivotal support thereof. Associated with the lever 30 is a means for biasing the lever to a first position. This is the position illustrated in solid outline in FIG. 1. This biasing means includes the spring 38 that is adapted to extend between oppositely disposed posts including a first post 40 extending upwardly from the bottom wall 35 of the housing, and a second post 42 that extends upwardly from the support end 31 of the lever 30. The spring 38 and the support posts 40 and 42 are clearly illustrated in both FIGS. 1 and 3.

The spring 38 rotates the lever 30 to the position shown in solid outline in FIG. 1 in which the lever engages a stop 44 that extends upwardly from the bottom wall 35 of the housing. The lever 30, at its actuating end 32, has a contacting surface 33 that may be pressed by the user's thumb to cause rotation of the lever 30 in a clockwise direction in FIG. 1. In this connection, refer to the lever 30 shown in phantom outline in FIG. 1 at the opposite extremity of its position. This may be referred to as a second alternate limiting position of the lever. In this position, it is noted that the lever then on the other side thereof at end 31 contacts the stop 46. See FIGS. 1 and 3. In FIG. 3 it is noted that the cross-sectional view is taken with the lever 30 in its second position. Note that the end 31 engages the stop 46. When the lever 30 is released by removing the thumb or other finger at the surface 33, then the spring 38 causes the lever to rotate back in a counter-clockwise direction and against the stop 44. The lever can be operated a number of times moving the cleaning pad 24 between the two alternate positions illustrated in FIG. 1 to cause a cleaning action of the magnetic tape head 16.

Now, in accordance with the invention means are provided at the lever support end 31 for supporting the cleaning pad 24 adjacent the front wall in the position illustrated in FIG. 1. This means includes a plate-like support member 50 having a bottom ledge 52 upon which the cleaning pad 24 rests as illustrated in FIG. 2, and means defining side-disposed channel members as illustrated at, for example, 54 in FIG. 6. In this regard, also refer to FIG. 4. The member 50 also has an aperture 56 for accommodating an end of the retainer 60 that is described in further detail hereinafter.

Reference is now made to, for example, FIGS. 1, 2, 4, and 6 for further details of the cleaning pad 24. Several versions of cleaning pads are described also in FIGS. 12–14 to be referenced hereinafter. In the embodiment of the cleaning pad described in FIGS. 2 and 6, there is provided a rigid support plate 62 and a resilient layer of a soft compressible material such as polyester foam. This is the layer 64 in, for example, FIG. 6. The layer 64 may be secured to the plate 62 by any well known adhesive. On top of the resilient layer 64 there is provided a cloth or mesh layer 66. Details are provided hereinafter regarding the mesh layer 66.

FIGS. 2 and 6 illustrate the manner in which the cleaning pad 24 is retained in the member 50. It is noted that the side extremities of the plate 62 that extend beyond the layer 64 engage in the side disposed channel members 54. The bottom of the plate 62 rests upon the ledge 52.

Reference is now made to FIGS. 1, 2 and 6 regarding the retainer 60. The retainer 60 is a soft plastic, flexible member that is of generally bowed construction as illustrated in FIG. 2. One end 61 is retained in a pocket provided in the lever 30. Refer to FIG. 2. The other end 63 of the retainer extends through the hole 56 in the member 50 and includes a rib 65 that is adapted to engage in an elongated recess 68 that is provided in the support plate 62 of the cleaning pad. In this way, the retainer 60 provides a biasing force on the pad 24 to help maintain it in position in the member 50. The rib 65 engages within the recess or channel 68 and thus provides additional interlocking to retain the cleaning pad in place. To remove the cleaning pad 24, one need only apply upward force in direction of arrow 71 in FIG. 2 to disengage the rib 65 from the recess 68. The cleaning pad can then be lifted out of the accommodating compartment in member 50.

Reference is now made to FIGS. 7-11 of the present application. In this connection, these drawings primarily show the further details of the pad dispenser of the present invention. This is illustrated at 70 in FIG. 7. It is noted in FIG. 7 that the dispenser 70 is illustrated in a position in which it is basically about to be aligned with the member 50 for insertion of a new pad 24. This is carried out by engaging the ears 72 of the dispenser 70 with corresponding slots 74 provided in the channel members 54 of member 50. When the ears 72 are properly in position in the corresponding slots 74, then the dispenser can be operated, as described in further detail hereinafter, to transfer cleaning pads directly into the member 50.

The cleaning pad dispenser 70 is comprised of a housing 75 that is basically constructed in two separate parts, 75a and 75b. These parts together define a compartment 76 that is dimensioned to receive the cleaning pad 24 including both the support plate 62 as well as the resilient layer 64. As illustrated, for example, in FIG. 10 a plurality of such pads 24 may be arranged in line. For example, the compartment 76 may accommodate say six cleaning pads in one embodiment.

Associated with the housing 75 is a slide member 80. Note in FIG. 10 that the member 80 is shown in solid position urged against a last one of the pads 24 also shown in solid position. FIG. 10 also illustrates the slide member 80 in dotted outline at the very opposite end of the housing 75 which is the position when the dispenser is fully loaded with a plurality of pads disposed in front of it.

The slide member 80 is disposed on the outside of the housing but includes a slide piece 82 that is on the inside at the compartment 76 and that is adapted to engage the plate 62 of the cleaning pad. Again, reference may be made to FIG. 10 illustrating this engagement. Reference may also be made to FIG. 11 for an illustration of the slide piece 82. The slide 80 and its associated slide piece 82 are adapted to slide within an elongated slot 84 that extends longitudinally of the housing part 75a. This enables the slide member 80 to slide back and forth always engaging the most furthest in of the cleaning pads. By moving the slide member forwardly, the cleaning pads all abut each other and the one closest to the output end of the dispenser can be moved outwardly into engagement with the member 50 of the cartridge housing.

Reference is now made to FIGS. 12-14 for three other embodiments of a cleaning pad in accordance with the present invention. FIG. 12 illustrates a cleaning pad that is comprised of only the plate 62 and resilient layer 64. The embodiment of FIG. 13 includes the plate 62, resilient layer 64, and cloth or mesh layer 66. Also, the embodiment of FIG. 13 is provided with a hole 64c in the layer 64. This hole allows for the cleaning of heads with crowns of various height and width.

Figure 15:
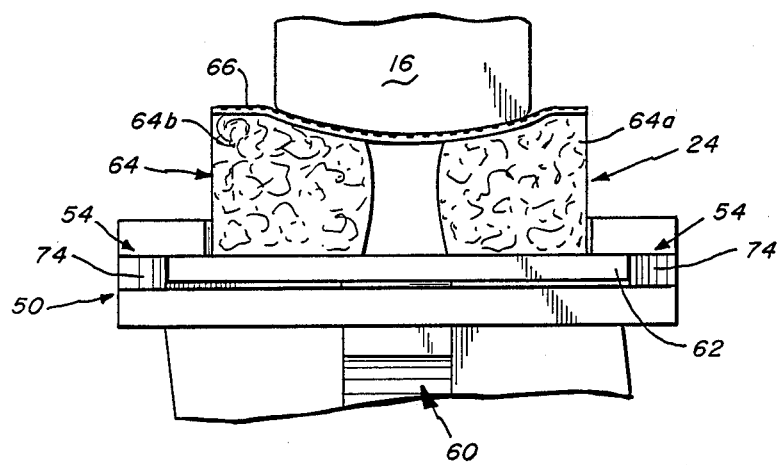
FIG. 15 illustrates the cleaning pad of FIG. 14 compressed against a tape head.

Finally, the embodiment of FIG. 14 is comprised of a support plate 62 along with resilient layer sections 64a and 64b having a gap therebetween. The cloth or mesh layer 66 bridges this gap. This embodiment is also useful in allowing the cleaning of heads with crowns of various heights and width. By providing the hold or the gap as illustrated in respective FIGS. 13 and 14, the outer layer 66 more uniformly and accurately is capable of following the head contour. In this regard, refer to FIG. 15 for an illustration of the contact between the layer 66 and the head 16.

As has been pointed out previously, the cleaning pad 24, and in particular the resilient layer 64, is constructed of a low density foam material such as polyester or polyurethane foam. The layer 66 is a mesh layer or cloth layer that may be constructed, for example, of nylon tricot. In one case, the layer 66 may be an 80 denier nylon tricot that is relatively smooth and a relatively soft material. This has a thickness of about 0.005 inch-0.010 inch. One side is flat. This is the side that adheres to the layer 64. The other surface is formed in ribs by weaving. In this regard, note in FIG. 6 the ribs 67. Thus, it is actually the ribs 67 themselves that are exposed to the head surface and that provide the limited amount of abrasiveness against the head surface. This abrasiveness is slight but is sufficient to enhance cleaning action. The ribs are exposed to the head surface and are oriented vertically in the direction of the head gap line and perpendicular to the direction of the wiping motion during the cleaning action. Refer in this regard to FIG. 6 which shows the alternate pad positions relative to the head 16a.

The lower flat surface of the nylon tricot layer 66 is bonded to the foam layer 64 and the other side of the foam layer is bonded to the metal or plastic base. The adhesives that are employed are of a type that will not be easily attacked by the cleaning fluids that are employed with the pad. These cleaning fluids are typically isopropyl alcohol. In particular, the bonding material between the nylon tricot and the polyester foam is to be elastic and flexible (not rigid) so that it does not impede the conformation of the pad to the head contour.

With respect to the resilient foam layer 64, this is preferably of uniform thickness and preferably has an even surface at the interface with the layer 66. The density of the foam provides the spring loading for the cleaning fabric. The foam material also enables the cleaning fabric to readily conform to the head contour, exerting higher pressure over the area where the magnetic tape contacts the head.

Reference is now made to FIG. 16 for an illustration of a kit form of cartridge cleaning product. The kit illustrated in FIG. 16 may be contained in a cardboard box that would have an end flap for opening. The kit includes the accommodating tray 100 which is adapted to receive in respective compartments thereof the cleaning fluid 102, the cleaning cartridge 104, and two dispensers 106. The cleaning cartridge 104 and dispensers have been described previously. The cleaning fluid 102 may be a cleaning agent such as trichlorotrifluorethane.

Reference is now made to FIG. 17 for an illustration of an alternate embodiment of the invention in which there is provided a magnetic head cleaning pad 24 as well as a capstan cleaning pad 94. It is noted in FIG. 17 that the pad 94 is shown disposed in the tape machine in a position so that it can contact the capstan 90 cleaning it. The capstan 90 is illustrated in FIG. 17 in dotted outline. The cleaning pad 94 may be substantially identical in construction to the cleaning pad 24. Similarly, the support for the pad 94 is illustrated at 50a and may be substantially the same as the support member 50 described previously in connection with the cleaning pad 24. FIG. 17 also shows a support 92 for supporting the member 50a. In the embodiment of FIG. 17 it is noted that the front wall is cut away further than in the embodiment of FIG. 1 providing a larger window at 20 so that the housing can accommodate not only the head cleaning pad 24 but also the capstan cleaning pad 94. In this embodiment of the invention, the head cleaning pad is movable in the same manner previously described in connection with FIG. 1. The capstan cleaning pad 94 on the other hand is stationary. However, the pad 94 itself is capable of being removed and replaced in the same manner as the pad 24. The removal is by pushing the pad outwardly as illustrated previously in connection with arrow 71 as shown in FIG. 2. The pad is both instances is replaced with the use of the insertion of a pad from the dispenser 70.

In accordance with one embodiment of the present invention the cleaning kit, referred to in FIG. 16 may contain a cleaning cartridge, one-half ounce of cleaning fluid and two throw away cleaning pad dispensers each having five cleaning pads disposed therein. The cleaning fluid is put onto the cleaning pads prior to insertion into the tape drive. While in the tape drive, the capstan cleans itself on the capstan wiper pad, and the tape head is cleaned by the tape head wiper pad when the user activiates the head cleaning lever at, for example, 33 in FIG. 1. The cleaner cartridge is ejected from the tape drive in the usual manner to complete the cleaning cycle.

With more particular reference to the operation of the cartridge of the present invention, initially, the cleaning cartridge is removed from the kit tray. Two or three drops of cleaning fluid are added to both the head wiper pad and the capstan wiper pad in the particular embodiment of FIG. 17. The cartridge is then inserted into the tape drive in the same manner as a standard cartridge would be inserted. When the cartridge is seated, the tape drive capstan motor turns the capstan continuously and the capstan cleans itself on the capstan wiper pad. The user activates the lever 30 four or five times to clean the tape head.

After this cleaning operation is completed, the cleaning cartridge is removed from the tape drive to complete the head/capstan cleaning cycle.

When the cleaning pad is to be replaced, say after four or five operations, either or both of the pads may be removed by pushing upwards with the thumb nail at the bottom of the wiper pad. A new cleaning pad can then be inserted from the dispenser by sliding the ears of the dispenser into the side slots of the wiper holder. The slide member on the dispenser then moves forward until a new pad is firmly seated in the wiper pad holder on the cartridge.

With respect to the cleaning action that is provided by the novel pad described herein, it is noted that when using the cleaning fluid or cleaning agent this causes a loosening of the magnetic particles and other types of particles or debris that normally contaminate the surface of a magnetic recording/reproducing head. When these particles become dislodged, they cause the nylon tricot to become more abrasive as they are essentially captured in the nylon tricot or namely layer 66. The abrasivity increases the friction between the surface of the head and the wiper pad enough to produce the desired results of head cleaning. This is a substantially improved form of cleaning over that attained with a normal pad that say is only of foam structure. In this connection, the function of the ribs of the nylon tricot is to exert pressure on the particles and force them to be displaced into the valley between the ribs where they adhere, anchor permanently, or pass through into the foam.

Reference is now made to FIG. 18 for an illustration of an alternate and preferred pad construction. In this embodiment, it is noted that the compartment for the pad is defined at least in part by side walls 120 with the pad supporting ledge being defined by bottom stop walls 122 that are adapted to limit the downward travel of the wiper pad. Also, the wiper pad itself has corner cutouts as illustrated at 124 in FIG. 18. These cutouts may appear at all four corners as illustrated in FIG. 18. In particular, the cutouts 124 at the bottom enable the pad to be properly centered. In this way, the bottom edge of the wiper pad is in line with the bottom edge of the pad receiving compartment which in turn is in line with the bottom of the cartridge. In this connection, FIG. 18 shows the pad support plate 126 and the resilient pad 128. Note that the lower edge 129 of the pad 128 is in line with the bottom of the stop walls 122.

Having now described a limited number of embodiments of the present invention, it should now be apparent to those skilled in the art that numerous other embodiments and modifications thereof are contemplated as falling within the scope of the present invention as defined by the appended claims.

What is claimed is:

1. A tape head cleaner cartridge adapted for receipt in a tape machine having a magnetic tape head that is supported for tape travel thereby, said cartridge comprising:

a cartridge housing having front and rear walls,
a cleaning pad,
a pad support and actuating lever having separate support and actuating ends,
means pivotally supporting said lever in the cartridge housing,
said means pivotally supporting said level providing motion of said lever support end in the tape travel direction;
means at the lever support end for supporting said cleaning pad adjacent said front wall
said cartridge housing front wall having means defining an access opening to permit positioning of said cleaning pad for contact with said tape head,
said cartridge housing rear wall having means defining an aperture for receiving at least part of the lever actuating end, means disposed in the cartridge housing for biasing the lever is a direction generally parallel to said tape travel direction whereby said lever is predisposed to move to a first position, said actuating end of the lever being capable of manual manipulation to a second position whereby the cleaning pad transitions across the tape head in the direction of tape travel between said first and second positions.

2. A tape head cleaner cartridge as set forth in claim 1 wherein said lever has its actuating end extending out of the housing in the first position thereof.

3. A tape head cleaner cartridge as set forth in claim 2 wherein said lever actuating end is manipulated inwardly to its second position.

4. A tape head cleaner cartridge as set forth in claim 3 wherein said lever actuating end has an actuating wall which is aligned with the housing rear wall when said actuating end of the lever is in said second position.

5. A tape head cleaner cartridge as set forth in claim 1 wherein said lever is of substantially L-shape configuration and said means pivotally supporting the lever comprises a pivot pin disposed closely adjacent said housing rear wall and extending in the direction orthogonal to the tape travel direction.

6. A tape head cleaner cartridge as set forth in claim 1 wherein said means for biasing comprises a spring means with at least two ends having an end fixed in position in the housing and having another end secured to said lever.

7. A tape head cleaner cartridge as set forth in claim 1 wherein said means for supporting the cleaning pad includes a mounting plate defining a pad receiving compartment having a bottom ledge upon which the pad may rest.

8. A tape head cleaner cartridge as set forth in claim 7 including resilient means disposed in the housing for holding the cleaning pad in place in said compartment.

9. A tape head cleaner cartridge as set forth in claim 1 including means for securing the pad to said mounting plate means.

10. A tape head cleaner cartridge as set forth in claim 9 wherein said lever has slot defining means for receiving the pad support plate.

11. A tape head cleaner cartridge as set forth in claim 1 in combination with a tape pad holder and dispenser that contains a plurality of separate cleaning pads adapted to be mounted for use in said tape head cleaner cartridge.

12. A tape head cleaner cartridge as set forth in claim 11 wherein said tape pad holder and dispenser comprises a housing for storing the pads and a slide member for expelling the pads, one at a time, from the housing.

13. A tape head cleaner cartridge as set forth in claim 12 including position alignment means at the pad holder and dispenser, and the pad support means to enable transfer of the pad to the pad support means.

14. A tape head cleaner cartridge as set forth in claim 1 including a second cleaning pad and means supporting said second cleaning pad at said front wall access opening to permit positioning of said second cleaning pad for contact with a capstan of said tape machine and to permit removal and replacement of said second cleaning pad.

15. A tape head cleaner cartridge as set forth in claim 14 wherein said means for supporting said second cleaning pad supports said pad in a stationary position in the housing.

16. A tape head cleaner cartridge as set forth in claim 15 wherein said second cleaning pad is readily removably supported.

17. A tape head cleaner cartridge adapted for receipt in a tape machine having a magnetic tape head comprising;

a cartridge housing having front and rear walls, a cleaning pad, a pad support and actuating lever having separate support and actuating ends, means pivotally supporting said lever in the cartridge housing, means at the lever support end for supporting said cleaning pad adjacent said front wall said cartridge housing front wall having means defining an access opening to permit positioning of said cleaning pad for contact with said tape head, said cartridge housing rear wall having means defining an aperture for receiving at least part of the lever actuating end, means disposed in the cartridge housing for biasing the lever to a first position, said actuating end of the lever being capable of manual manipulation to a second position whereby the cleaning pad transitions across the tape head in the direction of tape travel between said first and second positions, said means for supporting the cleaning pad including a pad receiving compartment having a bottom ledge upon which the pad may rest, a resilient means disposed in the housing for holding the cleaning pad in place in said compartment, said cleaning pad including a support plate having corner cut-outs and a resilient pad.

18. A tape head cleaner cartridge as set forth in claim 17 wherein said resilient means has a flexible end adapted to be urged against said pad support plate to hold the pad in place, wherein said bottom ledge is defined by space bottom stop walls, said support plate cutouts adapted to rest upon said stop walls.

19. A tape head cleaner cartridge as set forth in claim 18 wherein said support plate is recessed to receive said flexible end.

20. A tape head cleaner cartridge as set forth in claim 19 wherein said resilient means is of bowed construction.

21. A tape head cleaner cartridge adapted for receipt in a tape machine having a magnetic tape head comprising;

a cartridge housing having front and rear walls, a cleaning pad, a pad support and actuating lever having separate support and actuating ends, means pivotally supporting said lever in the cartridge housing, means at the lever support end for supporting said cleaning pad adjacent said front wall said cartridge housing front wall having means defining an access opening to permit positioning of said cleaning pad for contact with said tape head, said cartridge housing rear wall having means defining an aperture for receiving at least part of the lever actuating end, means disposed in the cartridge housing for biasing the lever to a first position, said actuating end of the lever being capable of manual manipulation to a second position whereby the cleaning pad transitions across the tape head in the direction of tape travel between said first and second positions, said means for supporting the cleaning pad including a pad receiving compartment having a bottom ledge upon which the pad may rest, a resilient means disposed in the housing for holding the cleaning pad in place in said compartment, a support plate for said cleaning pad and means for securing the pad to the plate, said lever having slot defining means for receiving the pad support plate, a mesh layer over said cleaning pad, said cleaning pad of a resilient foam type material.

22. A tape head cleaner cartridge as set forth in claim 21 wherein said foam pad is in two separated pieces with the mesh layer bridging therebetween.

23. A tape head cleaner cartridge as set forth in claim 21 wherein said foam pad has a through hole therein.

24. A tape head cleaner cartridge adapted for receipt in a tape machine having a magnetic tape head that is supported for tape travel thereby, said cartridge comprising;

a cartridge housing having front and rear walls, a cleaning pad, a pad support and actuating lever having separate support and actuating ends, pivot means supporting said lever in the cartridge housing, said pivot means supporting said lever and providing motion of said lever support end in the tape travel direction, said lever supported relative to said pivot means to maintain a constant distance between said pivot means and said lever support end through the range of travel of said lever in said tape travel direction, means at the lever support end for supporting said cleaning pad adjacent said front wall, said cartridge housing front wall having means defining an access opening to permit positioning of said cleaning pad for contact with said tape head, said cartridge housing rear wall having means defining an aperture for receiving at least part of the lever actuating end, means disposed in the cartridge housing for biasing the lever to a first position, said actuating end of the lever being capable of manual manipulation to a second position whereby the cleaning pad transitions across the tape head in the direction of tape travel between said first and second positions.

25. A tape head cleaner cartridge adapted for receipt in a tape machine having a magnetic tape head that is supported for tape travel thereby, said cartridge comprising;

a cartridge housing having front and rear walls, a cleaning pad, a pad support and actuating lever having separate support and actuating ends, means pivotally supporting said lever in the cartridge housing, said means pivotally supporting said lever providing motion of said lever support end in the tape travel direction;

means at the lever support end for supporting said cleaning pad adjacent said front wall said cartridge housing front wall having means defining an access opening to permit positioning of said cleaning pad for contact with said tape head, said cartridge housing rear wall having means defining an aperture for receiving at least part of the lever actuating end, means disposed in the cartridge housing for biasing the lever to a first position, said actuating end of the lever being capable of manual manipulation to a second position whereby the cleaning pad transitions across the tape head in the direction of tape travel between said first and second positions, said lever having its actuating end extending out of the housing in the first position thereof, said lever actuating end being manipulated inwardly to its second position, said lever actuating end having an actuating wall which is aligned with the housing rear wall when the actuating end of the lever is in it's second position.

26. A tape head cleaner cartridge adapted for receipt in a tape machine having a magnetic tape head that is supported for tape travel thereby, said cartridge comprising;

a cartridge housing having front and rear walls, a cleaning pad, a pad support and actuating lever having separate support and actuating ends, means pivotally supporting said lever in the cartridge housing, said means pivotally supporting said lever providing motion of said lever support end in the tape travel direction;

means at the lever support end for supporting said cleaning pad adjacent said front wall said cartridge housing front wall having means defining an access opening to permit positioning of said cleaing pad for contact with said tape head, said cartridge housing rear wall having means defining an aperture for receiving at least part of the lever actuating end, means disposed in the cartridge housing for biasing the lever to a first position, said actauting end of the lever being capable of manual maipulation to a second position whereby the cleaning pad transitions across the tape head in the direction of tape travel between said first and second positions, said lever being of substantially L-shape configuration and said means pivotally supporting the lever comprising a pivot pin disposed closely adjacent said housing rear wall.

27. A tape head cleaner cartridge as set forth in claim 26 wherein said L-shaped lever has orthogonally disposed arms, one defining the support end and the other defining the actuating end.

28. A tape head cleaner cartridge as set forth in claim 27 wherein the support end arm extends in the direction substantially orthogonal to the tape travel direction and the actuating end arm extends substantially in the same direction as the tape travel direction.

* * * * *